US012621769B2

(12) United States Patent
Chen et al.

(10) Patent No.: US 12,621,769 B2
(45) Date of Patent: May 5, 2026

(54) METHOD AND DEVICE FOR WIRELESS COMMUNICATION

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 226 days.

(21) Appl. No.: 18/228,690

(22) Filed: Aug. 1, 2023

(65) Prior Publication Data

US 2024/0056973 A1     Feb. 15, 2024

(30) Foreign Application Priority Data

Aug. 11, 2022     (CN) .......................... 202210960483.4

(51) Int. Cl.
H04W 52/02          (2009.01)
H04L 5/00           (2006.01)

(52) U.S. Cl.
CPC ....... H04W 52/0229 (2013.01); H04L 5/0051 (2013.01); H04L 5/006 (2013.01); H04L 5/0096 (2013.01)

(58) Field of Classification Search
CPC .. H04W 52/0229; H04L 5/0051; H04L 5/006; H04L 5/0096

USPC .......................................................... 370/311
See application file for complete search history.

(56) References Cited

U.S. PATENT DOCUMENTS

2021/0028984 A1*    1/2021   Da Silva ............... H04L 5/0048

FOREIGN PATENT DOCUMENTS

WO      WO-2019097457 A1 *   5/2019   ........... H04B 7/0413

* cited by examiner

*Primary Examiner* — Intekhaab A Siddiquee
(74) *Attorney, Agent, or Firm* — Volpe Koenig

(57)     ABSTRACT

The present application provides a method and device for wireless communications, comprising as a response to a first event, measuring first reference RSRP; executing a link quality evaluation based on a first measurement criterion; wherein when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period. The present application can better save electricity through the first measurement criterion.

20 Claims, 5 Drawing Sheets

100

METHOD AND DEVICE FOR WIRELESS COMMUNICATION

CROSS REFERENCE TO RELATED APPLICATIONS

This application claims the priority benefit of Chinese Patent Application 202210960483.4, filed on Aug. 11, 2022, the full disclosure of which is incorporated herein by reference.

BACKGROUND

Technical Field

The present application relates to transmission methods and devices in wireless communication systems, and in particularly to measurement control for power saving.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). A work Item (WI) of NR was approved at 3GPP RAN #75 plenary to standardize NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various service, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast transmission and unicast transmission, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

3GPP standardization organization has done related standardization work for 5G and formed a series of standards. The standard contents can be referred to:

In communication systems, power control is a very important issue.

https://www.3gpp.org/ftp/Specs/archive/38_series/38.213/38213-h00.zip https://www.3gpp.org/ftp/Specs/archive/38_series/38.331/38331-h00.zip

SUMMARY

In the latest 3GPP research topic, the issue of power savings is involved. For a terminal, an important aspect of power consumption is performing measurement and link quality evaluation. In the link quality evaluation, the terminal measures downlink reference signal resources and processes the measurement result, such as using a filter for smoothing, to monitor link quality. When the quality of a current link is found to be worse than a certain threshold, the terminal can take corresponding measures to improve it, such as notifying the network or selecting a better link for communications. If power is saved and link quality is evaluated, a configuration of an appropriate evaluation time can be considered, however, if the evaluation time is too long, it means that the link quality will decrease for a long time before it can be detected, which may lead to communication quality degradation, dropped calls, and other issues. Therefore, how to better control link quality evaluation is a problem that needs to be addressed. The control of link quality evaluation can be achieved by comparing the current measurement result with a reference value, for example, when the current measurement result is not significantly different from the reference value, a time for link quality evaluation can be appropriately relaxed. If the measurement result undergoes significant changes, it indicates that the link quality changes rapidly, and more frequent measurements and evaluations are needed to track the changes in the link. But this cannot solve all the problems, since in some cases, the configuration of reference signal resources used to evaluate link quality may change. If a new configuration is used, while the reference value is based on the previous configuration, problems can arise, either by incorrectly assuming that the link quality has not changed much and making it difficult to guarantee the quality of the communications, or by assuming that there has been a large change in the link quality and applying frequent quality evaluations results in power consumption. Therefore, how to properly determine the execution conditions for link quality evaluation and which events will trigger the evaluation or re-evaluation is a more important issue.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict. At the same time, the method proposed in the present application can also be used to solve other problems in communications.

The present application provides a method in a first node for wireless communications, comprising:

as a response to a first event, measuring first reference RSRP; executing a link quality evaluation based on a first measurement criterion;

herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, a problem to be solved in the present application comprises: how to save power, how to determine a measurement value, how to configure different evaluation periods, and how to adopt corresponding quality evaluations for different beams.

In one embodiment, advantages of the above method comprise: more power saving, more flexible, ensuring the communication quality, avoiding dropped calls, supporting different mobile states, and supporting communications with multiple beams.

Specifically, according to one aspect of the present application, the meaning of the phrase of measuring first reference RSRP comprises: setting a value of first reference RSRP to a current RSRP value.

Specifically, according to one aspect of the present application, the first event set comprises: receiving a configuration of a first measurement criterion, a MAC of a cell group configured with a first measurement criterion successfully completing a random access procedure, a difference value between the current RSRP and the first reference RSRP being greater than 0, the first measurement criterion not being satisfied within a first time period.

Specifically, according to one aspect of the present application, the meaning of the phrase that the first RS resource set is re-configured comprises: receiving a first signaling, the first signaling being used to indicate activating or de-activating at least one RS resource in the first RS resource set; the first signaling being a physical-layer signaling or the first signaling being a MAC-layer signaling Specifically, according to one aspect of the present application, the meaning of the phrase that the first RS resource set is re-configured comprises: receiving a second signaling, the second signaling being used to indicate adding or modifying or releasing at least one RS resource in the first RS resource set, and the second signaling being an RRC signaling.

Specifically, according to one aspect of the present application, the meaning of the phrase that the first RS resource set is re-configured comprises: receiving a third signaling, the third signaling indicating that a QCL parameter of the first RS resource set is a first QCL parameter;

herein, before the third signaling is received, a QCL parameter of the first RS resource set is a second QCL parameter.

Specifically, according to one aspect of the present application, the first event set comprises that a first timer is expired.

Specifically, according to one aspect of the present application, the meaning of the phrase that the first RS resource set is re-configured comprises: receiving a fourth signaling, the fourth signaling being used to indicate executing a first configuration set, the first configuration set comprising cell handover; the fourth signaling being a physical-layer signaling or the fourth signaling being a MAC-layer signaling.

Specifically, according to one aspect of the present application, the meaning of the phrase that the first RS resource set is re-configured comprises: receiving a fifth signaling, the fifth signaling being used to respond to the first signal;

herein, a reason why the first signal is triggered is due to beam failure; a transmitter of the first signal is the first node.

Specifically, according to one aspect of the present application, the first node is an IoT terminal.

Specifically, according to one aspect of the present application, the first node is a UE.

Specifically, according to one aspect of the present application, the first node is a relay.

Specifically, according to one aspect of the present application, the first node is an access network device.

Specifically, according to one aspect of the present application, the first node is a vehicle terminal.

Specifically, according to one aspect of the present application, the first node is an aircraft.

Specifically, according to one aspect of the present application, the first node is a mobile phone.

The present application provides a first node for wireless communications, comprising:

a first receiver, as a response to a first event, measuring first reference RSRP; executing a link quality evaluation based on a first measurement criterion;

herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the present application has the following advantages over conventional schemes:

it can save power while ensuring the communication quality.

it can save power of the network.

it can support dynamic configuration for reference signal resources at the physical layer or MAC layer.

it can support link quality evaluation for multiple TRPs.

it can support handover based on physical layer or MAC layer.

it can support various reference signals.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
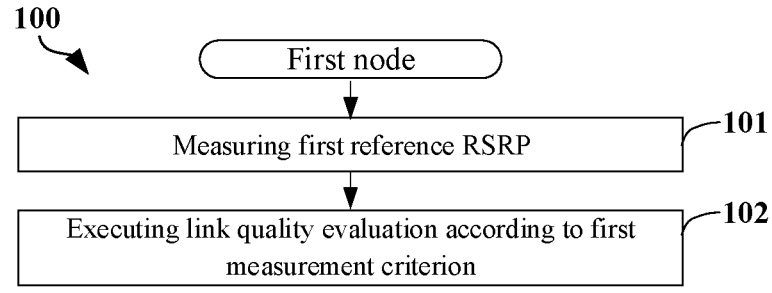
FIG. 1 illustrates a flowchart of measuring first reference RSRP according to one embodiment of the present application; a flowchart of executing a link quality evaluation based on a first measurement criterion.

Embodiment 1 illustrates a flowchart of measuring first reference RSRP according to one embodiment of the present application; a flowchart of executing a link quality evaluation based on a first measurement criterion, as shown in FIG. 1. In FIG. 1, each step represents a step, it should be particularly noted that the sequence order of each box herein does not imply a chronological order of steps marked respectively by these boxes.

In Embodiment 1, the first node in the present application measures first reference RSRP in step 101; executes a link quality evaluation based on a first measurement criterion in step 102.

herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the first node is a User Equipment (UE).

In one embodiment, the first node is in RRC_CONNECTED state.

In one embodiment, a serving cell refers to a UE-camped cell. Executing a cell search comprises: a UE searches for a suitable cell of a selected Public Land Mobile Network (PLMN) or a Stand-alone Non-Public Network (SNPN), selects the suitable cell to provide available traffic, and monitors a control channel of the suitable cell, and this procedure is defined as camping on a cell; that is to say, a camped cell is a serving cell of the UE relative to the UE. It has the following advantages to camp on a cell in RRC idle state or RRC inactive state: enabling the UE to receive a system message from a PLMN or an SNPN; after registration, if the UE wishes to establish an RRC connection or continue a suspended RRC connection, the UE can achieve this by executing an initial access on a control channel of the camping cell; the network may page the UE, which enables the UE to receive Earthquake and Tsunami Warning System (ETWS) and Commercial Mobile Alert System (CMAS) notifications.

In one embodiment, for a UE in RRC_CONNECTED state not configured with carrier aggregation/dual connectivity (CA/DC), only one serving cell comprises a primary cell. For a UE in RRC_CONNECTED state configured with carrier aggregation/dual connectivity (CA/DC), a serving cell is used to indicate a cell set comprising a Special Cell (SpCell) and all sub-cells. A Primary Cell is a Master Cell Group (MCG) cell, which works at primary frequency, and the UE executes an initial connection establishment procedure or initiates a connection re-establishment on a primary cell. For dual connectivity operation, a special cell refers to a Primary Cell (PCell) of an MCG or a Primary SCG Cell (PSCell) of an SCG; if it is not a dual connectivity operation, an SpCell refers to a PCell.

In one embodiment, frequency at which a Secondary Cell (SCell) works is sub-frequency.

In one embodiment, an individual content of an information element is called a field.

In one embodiment, a Multi-Radio Dual Connectivity (MR-DC) refers to a dual connectivity between an E-UTRA and an NR node, or a dual connectivity between two NR nodes.

In one embodiment, In MR-DC, a radio access node providing a control-plane connection to the core network is a master node, the master node may be a master eNB, a master ng-eNB, or a master gNB.

In one embodiment, an MCG refers to, in MR-DC, a group of serving cells associated with a master node, comprising an SpCell, and optionally one or multiple SCells.

In one embodiment, a PCell is an SpCell of an MCG.

In one embodiment, a PSCell is an SpCell of an SCG.

In one embodiment, in MR-DC, a radio access node not providing control plane connectivity to the core network and providing extra resources to a UE is a secondary node; the secondary node can be an en-gNB, a secondary ng-eNB or a secondary gNB.

In one embodiment, in MR-DC, a group of serving cells associated with a secondary node is a Secondary Cell Group (SCG), comprising an SpCell and optionally, one or multiple SCells.

In one embodiment, the first event triggers the first node to execute measuring first Reference Signal Receiving Power (RSRP).

In one embodiment, when a triggering condition of the first event is satisfied, the first node executes measuring first reference RSRP.

In one embodiment, when an entering condition of the first event is satisfied, the first node executes measuring first reference RSRP.

In one embodiment, when a leaving condition of the first event is satisfied, the first node executes measuring first reference RSRP.

In one embodiment, the meaning of the phrase of measuring first reference RSRP comprises: determining a value of first reference RSRP.

In one embodiment, the meaning of the phrase of measuring first reference RSRP comprises: measuring RSRP, setting a value of first reference RSRP to a value of current RSRP.

In one subembodiment of the embodiment, the measured RSRP is measuring RSRP on the first RS resource set.

In one subembodiment of the above embodiment, the measured RSRP is L3 RSRP.

In one embodiment, the first reference RSRP is a measurement referenced to L3 RSRP.

In one embodiment, the first reference RSRP is a measurement referenced to L3 RSRP performed on an SpCell of the first node.

In one embodiment, the first reference RSRP is for a measurement performed on the first RS resource set.

In one embodiment, the first reference RSRP is for a measurement performed on a radio link determined by the first RS resource set.

In one embodiment, the current RSRP is current L3 RSRP.

In one embodiment, the current RSRP is a measurement of current L3 RSRP of an SpCell.

In one embodiment, the current RSRP is for the first RS resource set.

In one embodiment, the current RSRP is for a measurement performed on the first RS resource set.

In one embodiment, the current RSRP is for a radio link determined by the first RS resource set.

In one embodiment, an SSB is an SS/PBCH block.

In one embodiment, the L3 RSRP is RSRP that applies a Layer 3 (L3) filter.

In one embodiment, the L3 RSRP is RSRP for L3 processing or reporting.

In one embodiment, RSRP is a measurement quantity.

In one embodiment, function of a L3 filter is $F_n=(1-a)*F_{n-1}+a*M_n$, where $M_n$ is a latest measurement result received from the physical layer; $F_n$ is an updated and filtered measurement result; $F_{n-1}$ is a previous filtered measurement result, and a is a coefficient.

In one embodiment, when a first measurement result is received from the physical layer, $F_0$ is set to $M_1$.

In one embodiment, $a=1/2^{(ki/4)}$, where ki is a filter coefficient configured for an i-th measurement quantity.

In one subembodiment of the embodiment, a serving cell of the first node is configured with filter coefficients.

In one embodiment, $a=1/2^{(k/4)}$, where k is a filter coefficient.

In one subembodiment of the embodiment, a serving cell of the first node is configured with the filter coefficients.

In one embodiment, the measured RSRP belongs to SS-RSRP.

In one embodiment, the current RSRP belongs to SS-RSRP.

In one embodiment, the measured RSRP belongs to L3 SS-RSRP.

In one embodiment, the current RSRP belongs to L3 SS-RSRP.

In one embodiment, SS-RSRP belongs to RSRP.

In one embodiment, SS-RSRP is used to determine RSRP.

In one embodiment, SS-RSRP is used to determine L3 RSRP.

In one embodiment, SS-RSRP is a linear average of power contributors on a resource unit carrying a secondary synchronization signal.

In one embodiment, an acquisition of SS-RSRP requires time-domain resources based on an SSB.

In one embodiment, the first measurement criterion is a low mobility measurement criterion.

In one embodiment, the first measurement criterion is a slowly-varying link measurement criterion.

In one embodiment, the first measurement criterion is a measurement criterion related to synchronization.

In one embodiment, the first measurement criterion is a measurement criterion related to movement.

In one embodiment, the first measurement criterion is a measurement criterion related to channel changes.

In one embodiment, the first RS resource set comprises at one RS resource.

In one embodiment, the first RS resource set comprises an SSB.

In one embodiment, the first RS resource set only comprises an SSB.

In one embodiment, the first RS resource set comprises a CSI-RS.

In one embodiment, the first RS resource set comprises a PRS.

In one embodiment, the first RS resource set does not comprise a CSI-RS.

In one embodiment, the first RS resource set does not comprise an SSB.

In one embodiment, a serving cell of the first node configures the first RS resource set through broadcast.

In one embodiment, a serving cell of the first node configures the first RS resource set through unicast.

In one embodiment, the first RS resource set corresponds to $\bar{q}_0$.

In one embodiment, the first RS resource set corresponds to $\bar{q}_{0,0}$.

In one embodiment, the first RS resource set corresponds to $\bar{q}_{0,1}$.

In one embodiment, the second RS resource set corresponds to $\bar{q}_0$.

In one embodiment, the second RS resource set corresponds to $\bar{q}_{0,0}$.

In one embodiment, the second RS resource set corresponds to $\bar{q}_{0,1}$.

In one embodiment, the second RS resource set is a BFD-RS set.

In one embodiment, the first RS resource set is a BFD-RS set.

In one embodiment, the first RS resource set comprises the second resource set.

In one embodiment, the second RS resource set comprises the first resource set.

In one embodiment, the first RS resource set and the second RS resource set are orthogonal.

In one embodiment, an intersection of the first RS resource set and the second RS resource set is not empty.

In one embodiment, the first RS resource set corresponds to a cell.

In one embodiment, the first RS resource set corresponds to a TRP.

In one embodiment, the second RS resource set corresponds to a cell.

In one embodiment, the second RS resource set corresponds to a TRP.

In one embodiment, the behavior of executing a link quality evaluation comprises: radio link monitoring.

In one embodiment, the behavior of executing a link quality evaluation does not comprise radio link monitoring.

In one embodiment, the behavior of executing a link quality evaluation comprises: beam failure detecting.

In one embodiment, the behavior of executing a link quality evaluation comprises: evaluating whether quality of a radio link is worse than a specific threshold.

In one embodiment, the behavior of executing a link quality evaluation comprises: evaluating whether quality of a radio link is worse than a specific threshold for the first RS resource set.

In one embodiment, the behavior of executing a link quality evaluation comprises: evaluating whether quality of a radio link on the first RS resource set is worse than a specific threshold.

In one embodiment, the behavior of executing a link quality evaluation comprises: evaluating whether quality of a radio link on a second RS resource set is worse than a specific threshold.

In one embodiment, the first specific threshold is configured by a serving cell.

In one embodiment, the first specific threshold is configured by network.

In one embodiment, the first specific threshold is a fixed value.

In one embodiment, the first specific threshold is determined by the first node itself based on an internal algorithm.

In one embodiment, the behavior of executing a link quality evaluation comprises: measuring RSRP on the first RS resource set and comparing a measurement result with a specific threshold.

In one embodiment, the behavior of executing a link quality evaluation comprises: measuring RSRP on the first RS resource set and evaluating whether a measurement result is worse than specific threshold.

In one embodiment, the behavior of executing a link quality evaluation comprises: measuring RSRP on a second RS resource set and comparing a measurement result with a specific threshold.

In one embodiment, the behavior of executing a link quality evaluation comprises: measuring RSRP on a second RS resource set and evaluating whether a measurement result is worse than a specific threshold.

In one embodiment, the SpCell is or comprises a PCell.

In one embodiment, the SpCell is or comprises a PSCell.

In one embodiment, the first threshold is indicated by network.

In one embodiment, the first threshold is indicated by a serving cell of the first node.

In one embodiment, the first threshold belongs to a configuration of the first quality criterion.

In one embodiment, the meaning of the phrase that a difference value between first reference RSRP and current RSRP is less than the first threshold is: a result of subtracting a value of current RSRP from a value of first reference RSRP is less than a first threshold.

In one embodiment, the first evaluation period and a second evaluation period are a period of time.

In one embodiment, the first evaluation period is not equal to the second evaluation period.

In one embodiment, the first evaluation period is measured by ms.

In one embodiment, the second evaluation period is measured by ms.

In one embodiment, the first evaluation period at least comprises 1 ms.

In one embodiment, the second evaluation period at least comprises 1 ms.

In one embodiment, a first evaluation period is related to a DRX configuration.

In one embodiment, a second evaluation period is related to a DRX configuration.

In one embodiment, the first evaluation period is limited.

In one embodiment, the second evaluation period is limited.

In one embodiment, the first evaluation period is $T_{Evaluation\_BFD\_SSB\_Relax}$.

In one embodiment, the second evaluation period is $T_{Evaluate\_BFD\_SSB}$.

In one embodiment, the first evaluation period is $T_{Evaluate\_BFD\_CSI-RS\_Relax}$.

In one embodiment, the second evaluation period is $T_{Evaluate\_BFD\_CSI-RS}$.

In one embodiment, a first evaluation period is related to a DRX cycle.

In one embodiment, the first evaluation period satisfies Max(50×K3, Ceil(7.5×K1×P)×Max($T_{DRX}$,$T_{SSB}$)), where Max ( ) is a function that takes a maximum value, Ceil ( ) is a rounding up function, P is a parameter related to a measurement gap, and $T_{DRX}$ is a target DRX cycle.

In one subembodiment of the above embodiment, $T_{SSB}$ is a cycle of an SSB.

In one subembodiment of the above embodiment, the $T_{SSB}$ is a cycle of an SSB in the second RS resource set.

In one subembodiment of the above embodiment, the $T_{SSB}$ is a resource cycle of an SSB in the second RS resource set.

In one subembodiment of the above embodiment, K1 is equal to 2 or 4.

In one subembodiment of the above embodiment, K3 is equal to 1 or K1.

In one subembodiment of the above embodiment, K3 is related to a value of K1, and when K1 is greater than 1 and less than or equal to 2, K3 is equal to K1; when K1 is greater than 2, K3 is equal to 1.

In one subembodiment of the above embodiment, a value of K1 is related to a value of Max ($T_{DRX}$, $T_{SSB}$).

In one subembodiment of the above embodiment, when a value of Max ($T_{DRX}$, $T_{SSB}$) is less than or equal to 40 ms, a value of K1 is 2.

In one subembodiment of the above embodiment, when a value of Max ($T_{DRX}$, $T_{SSB}$) is greater than 40 ms and less than or equal to 80 ms, a value of K1 is 4.

In one subembodiment of the above embodiment, a value of Max ($T_{DRX}$, $T_{SSB}$) is less than or equal to 80 ms.

In one subembodiment of the above embodiment, working frequency is FR1.

In one embodiment, the second evaluation period is related to a DRX cycle.

In one embodiment, the second evaluation period satisfies Max(50, Ceil(5×P)×$T_{SSB}$), where Max ( ) is a function that takes a maximum value, Ceil ( ) is a rounding up function, P is a parameter related to a measurement gap, and the first node does not use DRX.

In one subembodiment of the above embodiment, $T_{SSB}$ is a cycle of an SSB.

In one subembodiment of the above embodiment, the $T_{SSB}$ is a cycle of an SSB in the second RS resource set.

In one subembodiment of the above embodiment, the $T_{SSB}$ is a resource cycle of an SSB in the second RS resource set.

In one subembodiment of the above embodiment, working frequency is FR1.

In one embodiment, the second evaluation period satisfies Max(50, Ceil($7.5 \times P$)$\times$Max($T_{DRX}$,$T_{SSB}$)), where Max Q is a function that takes a maximum value, Ceil ( ) is a rounding up function, P is a parameter related to a measurement gap, $T_{SSB}$ is a cycle of an SSB, and $T_{DRX}$ is a DRX cycle.

In one subembodiment of the above embodiment, the $T_{SSB}$ is a cycle of an SSB in the second RS resource set.

In one subembodiment of the above embodiment, working frequency is FR1.

In one subembodiment of the embodiment, a DRX cycle is less than or equal to 320 ms.

In one embodiment, the method proposed in the present application is applicable to FR1 and FR2.

In one embodiment, the first evaluation period satisfies Max($50 \times K3$, Ceil($K1 \times 1.5 \times M_{BFD} \times P \times P_{BFD}$)$\times$Max($T_{DRX}$, $T_{CSI-RS}$)), where Max ( ) is a function that takes a maximum value, Ceil ( ) is a rounding up function, P is a parameter related to a measurement gap, and $T_{DRX}$ is a DRX cycle.

In one subembodiment of the above embodiment, $T_{CSI-RS}$ is a cycle of a CSI-RS.

In one subembodiment of the above embodiment, the $T_{CSI-RS}$ is a cycle of a CSI-RS in the second RS resource set.

In one subembodiment of the above embodiment, the $T_{CSI-RS}$ is a resource cycle of a CSI-RS in the second RS resource set.

In one subembodiment of the above embodiment, K1 is equal to 2 or 4.

In one subembodiment of the above embodiment, K3 is equal to 1 or K1.

In one subembodiment of the above embodiment, K3 is related to a value of K1, and when K1 is greater than 1 and less than or equal to 2, K3 is equal to K1; when K1 is greater than 2, K3 is equal to 1.

In one subembodiment of the above embodiment, a value of K1 is related to a value of Max ($T_{DRX}$, $T_{CSI-RS}$).

In one subembodiment of the above embodiment, when a value of Max ($T_{DRX}$, $T_{CSI-RS}$) is less than or equal to 40 ms, a value of K1 is 2.

In one subembodiment of the above embodiment, when a value of Max (TORY, $T_{CSI-RS}$) is greater than 40 ms and less than or equal to 80 ms, a value of K1 is 4.

In one subembodiment of the above embodiment, a value of Max ($T_{DRX}$, $T_{CSI-RS}$) is less than or equal to 80 ms.

In one subembodiment of the above embodiment, working frequency is FR1.

In one subembodiment of the above embodiment, $P_{BFD}$=1.

In one subembodiment of the above embodiment, for a PCell in an NR-DC, a PCell or a PSCell in EN-DC or NE-DC or SA, $P_{BFD}$=1.

In one subembodiment of the above embodiment, if a BFD of an SCell is configured, $P_{BFD}$=2 or a multiple of 2.

In one subembodiment of the above embodiment, a typical value of $M_{BFD}$ is 10.

In one subembodiment of the above embodiment, when a bandwidth is greater than 24 physical resource blocks (PRBs), a density of reference signal resources used for a BFD is equal to 3, and a value of the $M_{BFD}$ is 10.

In one embodiment, the meaning of the phrase that the first RS resource set is reconfigured comprises: a transmission cycle of at least one RS resource in the first RS resource set is reconfigured.

In one embodiment, the meaning of the phrase that the first RS resource set is reconfigured comprises: a time-domain parameter of at least one RS resource in the first RS resource set is reconfigured.

In one embodiment, the meaning of the phrase that the first RS resource set is reconfigured comprises: a frequency-domain parameter of at least one RS resource in the first RS resource set is reconfigured.

In one embodiment, the meaning of the phrase of completing an evaluation for first radio link quality within a first evaluation period comprises: it is possible to evaluate whether first radio link quality is worse than a specific threshold during the first evaluation period.

In one embodiment, the meaning of the phrase of completing an evaluation for first radio link quality within a first evaluation period comprises: evaluating whether first radio link quality is worse than a specific threshold within a time determined within any first evaluation period.

In one embodiment, the meaning of the phrase of completing an evaluation for first radio link quality within a first evaluation period comprises: an evaluation of radio link quality on the second RS resource set within a time determined in a previous first evaluation period starts to be worse than a specific threshold.

In one embodiment, the meaning of the phrase of completing an evaluation for first radio link quality within a second evaluation period comprises: it is possible to evaluate whether first radio link quality is worse than a specific threshold within the second evaluation period.

In one embodiment, the meaning of the phrase of completing an evaluation for first radio link quality within a second evaluation period comprises: evaluating whether first radio link quality is worse than a specific threshold within any time determined within a second evaluation period.

In one embodiment, the meaning of the phrase of completing an evaluation for first radio link quality within a second evaluation period comprises: an evaluation of radio link quality on the second RS resource set within a time determined in a previous second evaluation period starts to be worse than a specific threshold.

In one embodiment, the first radio link quality is quality of a radio link determined by or corresponding to the second RS resource set.

In one embodiment, the first radio link quality is quality of a current beam.

In one embodiment, the first radio link quality is quality of a radio link determined by or corresponding to the first RS resource set.

In one embodiment, the first radio link quality is quality of a radio link where a PDCCH being monitored is located.

In one embodiment, the first radio link quality is quality of a radio link where a CORESET is located.

In one embodiment, the first radio link quality is quality of a radio link associated with or corresponding to a first physical cell identity (PCI).

In one embodiment, the first link quality is quality of a radio link associated with or corresponding to a second PCI.

In one embodiment, both the first PCI and the second PCI are associated with an SpCell of the first node.

In one embodiment, the first radio link quality comprises RSRP of a radio link.

In one embodiment, the specific threshold is $Q_{out\_LR\_SSB}$.

In one embodiment, the specific threshold is acquired through a hypothetical verification of PDCCH receiving quality.

In one embodiment, whether the first measurement criterion is satisfied is used to determine a power adjustment state of the first node.

In one embodiment, L3 RSRP belongs to RSRP.

In one embodiment, the current RSRP is current measured RSRP.

In one embodiment, the current RSRP is latest RSRP.

In one embodiment, the current RSRP is RSRP being investigated.

In one embodiment, the first reference RSRP is SS-RSRP$_{Ref}$.

In one embodiment, the current RSRP is SS-RSRP.

In one embodiment, the meaning of the phrase of measuring first reference RSRP comprises: setting a value of first reference RSRP to a value of current RSRP.

In one embodiment, as a response to a first event, a value of first reference RSRP is set to a value of current RSRP.

In one embodiment, the first event set comprises: receiving a configuration of a first measurement criterion.

In one subembodiment of the above embodiment, the meaning of the phrase of receiving a configuration of a first measurement criterion comprises: a configuration of at least one parameter of the first measurement criterion is received.

In one subembodiment of the above embodiment, the meaning of the phrase of receiving a configuration of a first measurement criterion comprises: a configuration of the first threshold of the first measurement criterion is received.

In one embodiment, the first event set comprises: a MAC of a cell group configured with the first measurement criterion successfully completes a random access procedure.

In one subembodiment of the above embodiment, the random access procedure in which a MAC of a cell group configured with a first measurement criterion is successfully completed is executed after reconfigurationWithSync comprised in spCellConfig is executed.

In one subembodiment of the above embodiment, the random access procedure in which a MAC of a cell group configured with a first measurement criterion is successfully completed is triggered by executing reconfigurationWithSync comprised in spCellConfig.

In one subembodiment of the above embodiment, an SpCell corresponding to a cell group configured with a first measurement criterion is a destination cell.

In one subembodiment of the above embodiment, the random access procedure in which a MAC of a cell group configured with a first measurement criterion is successfully completed is not triggered by executing reconfiguration-WithSync comprised in spCellConfig.

In one subembodiment of the above embodiment, the random access procedure in which a MAC of a cell group configured with a first measurement criterion is successfully completed is triggered by link re-establishment or RRC re-establishment.

In one embodiment, the first event set comprises: a difference value between the current RSRP and the first reference RSRP is greater than 0.

In one subembodiment of the above embodiment, the meaning of the phrase that a difference value between the current RSRP and the first reference RSRP is greater than 0 is: a result of subtracting the first reference RSRP from the current RSRP is greater than 0.

In one embodiment, the first event set comprises: the first measurement criterion is not satisfied within a first time period.

In one subembodiment of the above embodiment, a time when the first measurement criterion is not satisfied at least exceeds the first time length.

In one embodiment, a configuration of the first measurement criterion comprises the first time length.

In one embodiment, the first event set comprises: leaving RRC connected state.

In one embodiment, the first event set comprises: occurring BWP handover.

In one embodiment, the first event set comprises: SMTC being reconfigured.

In one embodiment, the first event set comprises: a signaling used for activating the first measurement criterion being received.

In one subembodiment of the embodiment, the received signaling used for activating the first measurement criterion is a MAC CE.

In one subembodiment of the embodiment, the received signaling used for activating the first measurement criterion is a DCI.

In one embodiment, the first event set comprises: a signal being received after executing reconfigurationWithSync comprised in spCellConfig, executing reconfigurationWith-Sync comprised in spCellConfig not triggering a random access.

In one embodiment, the first event set comprises an expiration of a first timer.

In one embodiment, an expiration of the first timer is used to deactivate the first cell group.

In one embodiment, an expiration of the first timer is used for BWP handover.

In one embodiment, an expiration of the first timer is used to determine radio link failure.

In one embodiment, an expiration of the first timer is used to determine radio link recovery failure.

In one embodiment, the first timer is a timer on sidelink.

In one embodiment, the first timer is a timer on main link.

In one embodiment, the first timer comprises one of T304, T301, T316, T310, and T311.

In one embodiment, the first timer comprises T430.

In one embodiment, the first timer is related to NTN.

Embodiment 2

Figure 2:
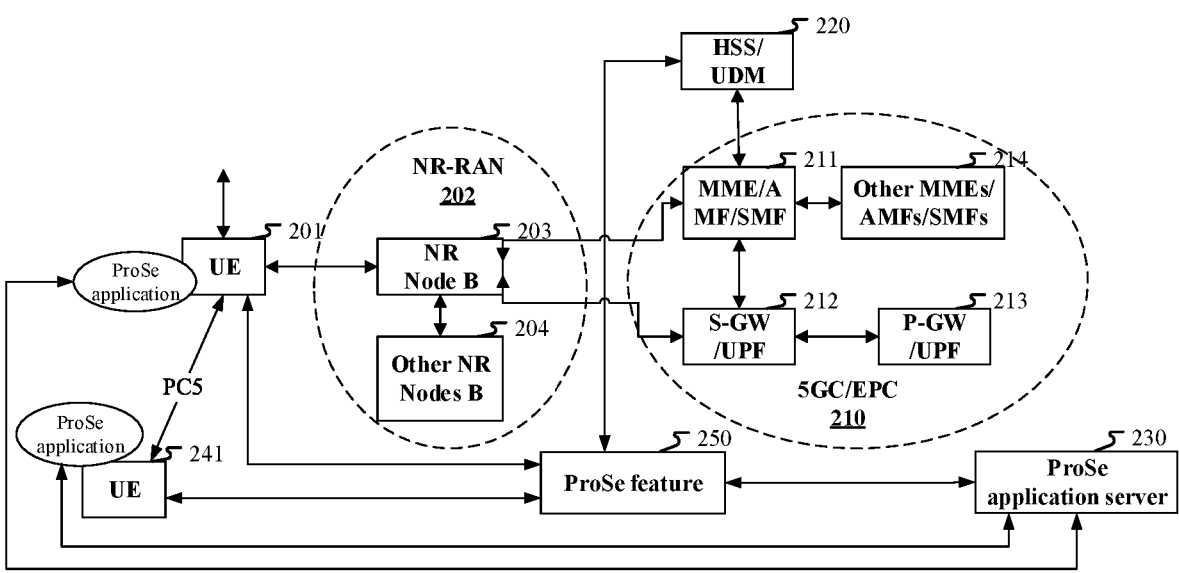
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application is UE 201.

In one embodiment, a base station of the second node in the present application is gNB 203.

In one embodiment, a radio link between the UE 201 and NR node B is an uplink.

In one embodiment, a radio link between NR node B and UE 201 is a downlink.

In one embodiment, the UE 201 supports relay transmission.

In one embodiment, the UE 201 comprises a mobile phone.

In one embodiment, the UE 201 is a vehicle comprising a car.

In one embodiment, the gNB 203 is a MarcoCellular base station.

In one embodiment, the gNB 203 is a Micro Cell base station.

In one embodiment, the gNB 203 is a Pico Cell base station.

In one embodiment, the gNB 203 is a flight platform.

In one embodiment, the gNB 203 is satellite equipment.

Embodiment 3

Figure 3:
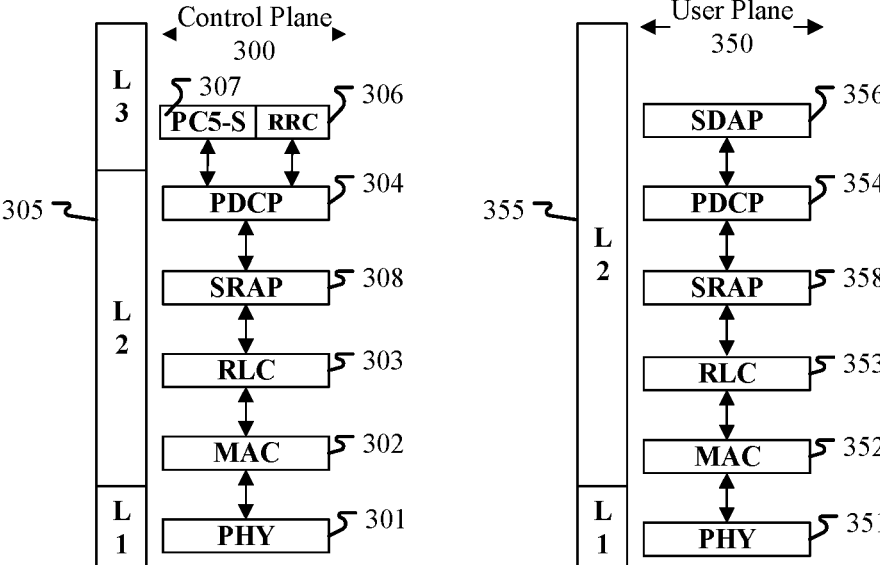
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. SRB can be seen as a service or interface provided by the PDCP layer to a higher layer, such as the RRC layer. In NR system, SRB comprises SRB1, SRB2, SRB3, and when it comes to sidelink communications, there is also SRB4, which is respectively used to transmit different types of control signalings SRB, a bearer between a UE and access network, is used to transmit a control signaling, comprising an RRC signaling, between UE and access network. SRB1 has special significance for a UE. After each UE establishes an RRC connection, there will be SRB1 used to transmit RRC signaling Most of the signalings are transmitted through SRB1. If SRB1 is interrupted or unavailable, the UE must perform RRC reconstruction. SRB2 is generally used only to transmit an NAS signaling or signaling related to security aspects. UE cannot configure SRB3. Except for emergency services, a UE must establish an RRC connection with the network for subsequent communications. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.). For UE involving relay service, its control plane can also comprise the adaptation sub-layer Sidelink Relay Adaptation Protocol (SRAP) 308, and its user plane can also comprise the adaptation sub-layer SRAP358, the introduction of the adaptation layer helps lower layers, such as MAC layer, RLC layer, to multiplex and/or distinguish data from multiple source UEs. For nodes that do not involve relay communications, PC5-S307, SRAP308 and SRAP358 are not required in the communication process.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the MAC 302 or the PHY 301.

In one embodiment, the second signaling in the present application is generated by the RRC 306.

In one embodiment, the third signaling in the present application is generated by the RRC 306 or the MAC 302 or the PHY 301.

In one embodiment, the fourth signaling in the present application is generated by the MAC 302 or the PHY 301.

In one embodiment, the fifth signaling in the present application is generated by the RRC 306 or the MAC 302 or the PHY 301.

In one embodiment, the first signal in the present application is generated by the MAC 302 or the PHY 301.

Embodiment 4

Figure 4:
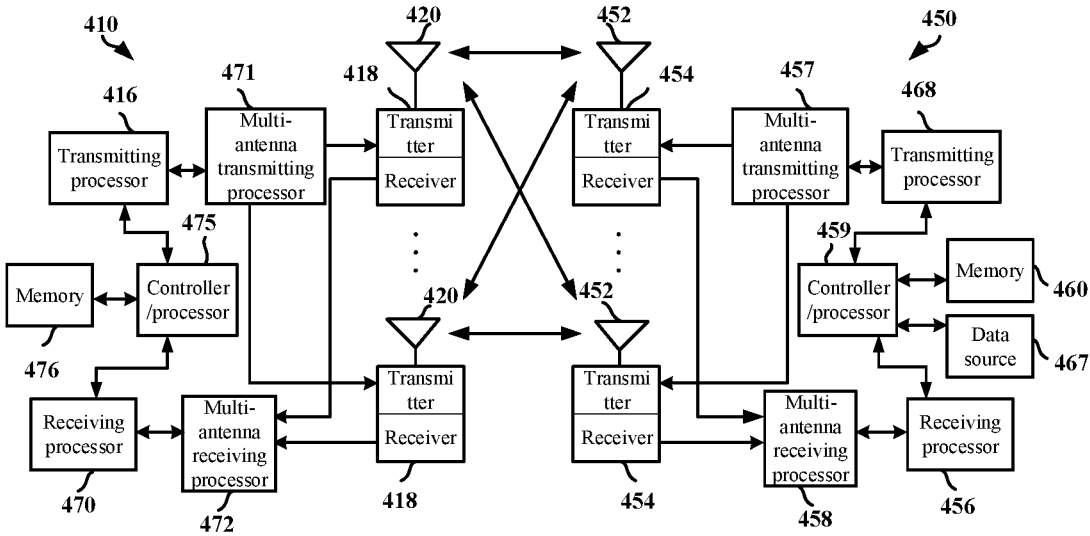
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device

410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory.

The at least one memory comprises computer program codes; the at least one memory and the computer program codes are configured to be used in collaboration with the at least one processor, the first communication device 450 at least: as a response to a first event, measures first reference RSRP; executes a link quality evaluation based on a first measurement criterion; herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the first communication device 450 comprises at least one processor and at least one memory. a memory that stores a computer readable instruction program. The computer readable instruction program generates an action when executed by at least one processor. The action includes: as a response to a first event, measuring first reference RSRP; executing a link quality evaluation based on a first measurement criterion; herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the second communication device 450 is a relay.

In one embodiment, the second communication device 410 is a satellite.

In one embodiment, the second communication device 410 is an aircraft.

In one embodiment, the second communication device 410 is a base station.

In one embodiment, the receiver 454 (comprising the antenna 452), the receiving processor 456 and the controller/processor 459 are used to receive the first signaling in the present application.

In one embodiment, the receiver 454 (comprising the antenna 452), the receiving processor 456 and the controller/processor 459 are used to receive the second signaling in the present application.

In one embodiment, the receiver 454 (comprising the antenna 452), the receiving processor 456 and the controller/ processor 459 are used to receive the third signaling in the present application.

In one embodiment, the receiver 454 (comprising the antenna 452), the receiving processor 456 and the controller/ processor 459 are used to receive the fourth signaling in the present application.

In one embodiment, the receiver 454 (comprising the antenna 452), the receiving processor 456 and the controller/ processor 459 are used to receive the fifth signaling in the present application.

In one embodiment, the transmitter 454 (comprising antenna 452), the transmitting processor 468 and the controller/processor 459 are used to transmit the first signal in the present application.

Embodiment 5

Figure 5:
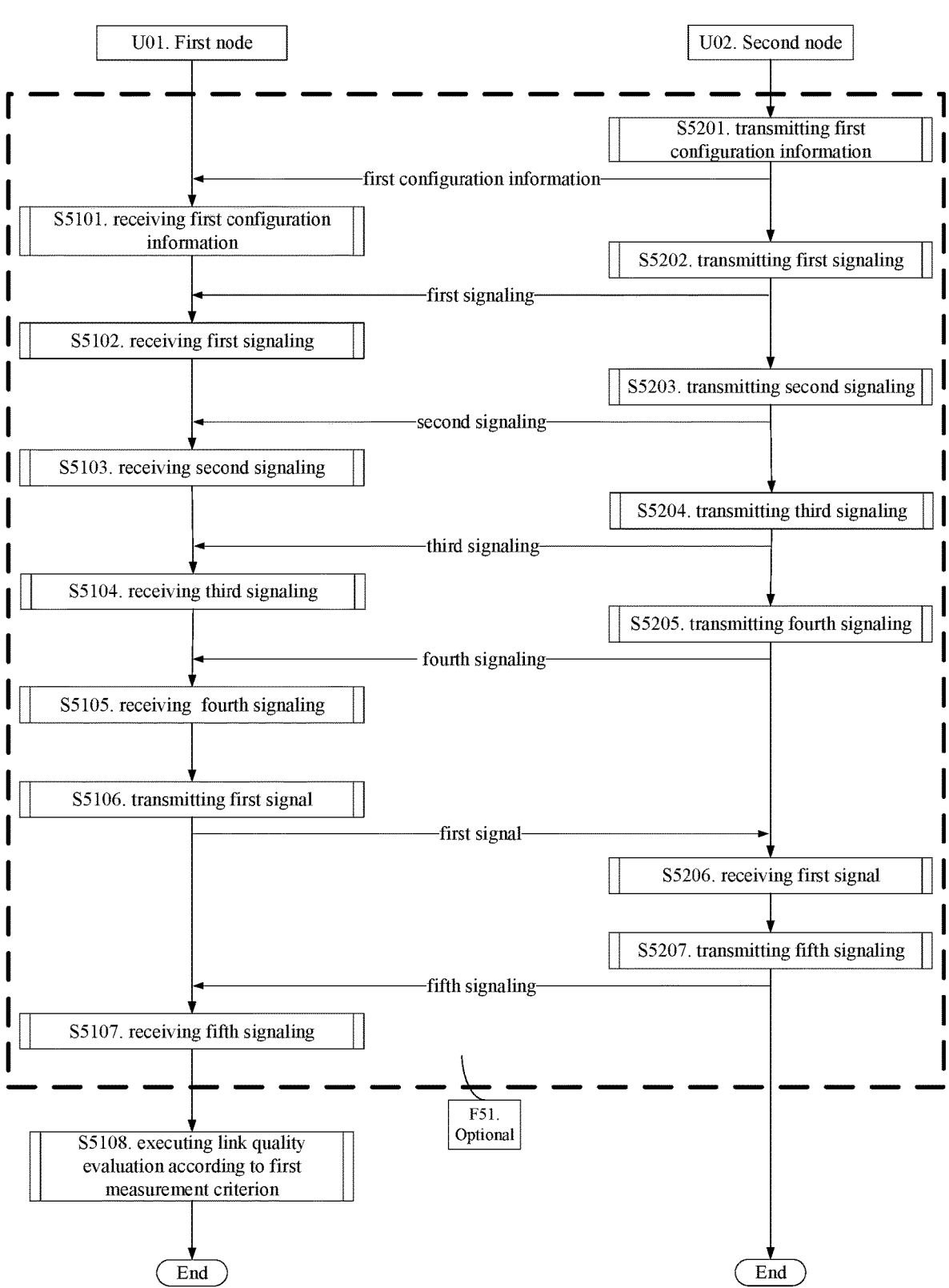
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application. It is particularly underlined that the order illustrated in the embodiment does not put constraints over sequences of signal transmissions and implementations and steps in F51 are optional.

The first node U01 receives first configuration information in step S5101; receives a first signaling in step S5102; receives a second signaling in step S5103; receives a third signaling in step S5104; receives a fourth signaling in step S5105; transmits a first signal in step S5106; receives a fifth signaling in step S5107; executes a link quality evaluation based on a first measurement criterion in step S5108.

The second node U02 transmits first configuration information in step S5201; transmits a first signaling in step S5202; transmits a second signaling in step S5203; transmits a third signaling in step S5204; and transmits a fourth signaling in step S5205; receives a first signal in step S5206; transmits a fifth signaling in step S5207.

In embodiment 5, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the first node U01 is a UE, and the second node U02 is a serving cell or a cell group of the first node U01.

In one embodiment, the first node U01 is a UE, and the second node U02 is a base station serving the first node U01.

In one embodiment, the first node transmits the first signaling through downlink.

In one embodiment, the second node U02 is the first cell group.

In one embodiment, the second node U02 is a serving cell in the first cell group.

In one embodiment, the second node U02 is an MN of the first cell group.

In one embodiment, the second node U02 is a PCell.

In one embodiment, the second node U02 is a PSCell.

In one embodiment, the first configuration information comprises an RRC message.

In one embodiment, the first configuration information comprises an RRCReconfiguration message.

In one embodiment, the first configuration information comprises a configuration for a first measurement criterion.

In one embodiment, the first configuration information indicates an application of the first measurement criterion.

In one embodiment, the meaning of the phrase that the first RS resource set is reconfigured comprises: receiving a first signaling, the first signaling being used to indicate activating or de-activating at least one RS resource in the first RS resource set; the first signaling being a physical-layer signaling or the first signaling being a MAC-layer signaling.

In one embodiment, the first signaling is used to indicate activating or de-activating at least one RS resource in the first RS resource set.

In one embodiment, the first signaling is a physical-layer signaling or the first signaling is a MAC-layer signaling.

In one embodiment, the first signaling is a DCI.

In one embodiment, the first signaling is a MAC CE.

In one embodiment, the first signaling indicates activating the first RS resource set.

In one embodiment, the first signaling indicates activating an SSB in the first RS resource set.

In one embodiment, the first signaling indicates activating at least one SSB in the first RS resource set.

In one embodiment, the first signaling indicates activating RS resources corresponding to an SSB in the first RS resource set.

In one embodiment, the first signaling indicates activating an SSB corresponding to a first PCI in the first RS resource set.

In one embodiment, the first signaling indicates activating an SSB corresponding to a second PCI in the first RS resource set.

In one embodiment, the first signaling indicates de-activating the first RS resource set.

In one embodiment, the first signaling indicates de-activating an SSB in the first RS resource set.

In one embodiment, the first signaling indicates de-activating at least one SSB in the first RS resource set.

In one embodiment, the first signaling indicates de-activating RS resources corresponding to an SSB in the first RS resource set.

In one embodiment, the first signaling indicates de-activating RS resources corresponding to at least one SSB in the first RS resource set.

In one embodiment, the first signaling indicates de-activating an SSB or RS resources corresponding to the SSB corresponding to a first PCI in the first RS resource set.

In one embodiment, the first signaling indicates de-activating an SSB or RS resources corresponding to the SSB corresponding to a second PCI in the first RS resource set.

In one embodiment, the first signaling indicates de-activating at least one SSB in the first RS resource set, and indicates activating at least another SSB in the first RS resource set.

In one embodiment, the first signaling indicates de-activating RS resources corresponding to at least one SSB in the first RS resource set, and indicates activating RS resources corresponding to at least another SSB in the first RS resource set at the same time.

In one embodiment, the meaning of the phrase that the first signaling is used to indicate activating or de-activating at least one RS resource in the first RS resource set comprises: the first signaling is used to indicate activating or de-activating a TRP.

In one embodiment, the meaning of the phrase that the first signaling is used to indicate activating or de-activating at least one RS resource in the first RS resource set comprises: the first signaling is used to indicate activating or de-activating a beam.

In one embodiment, a second signaling is received, the second signaling is used to indicate adding or modifying or releasing at least one RS resource in the first RS resource set, and the second signaling is an RRC signaling.

In one embodiment, the second signaling comprises RRCReconfiguration.

In one embodiment, the second signaling comprises a System Information Block (SIB).

In one embodiment, the second signaling comprises SpCellConfig.

In one embodiment, the second signaling comprises a failureDetectionResourcesToAddModList.

In one embodiment, the second signaling comprises BeamFailureDetectionSet.

In one embodiment, the second signaling comprises a failureDetectionResourcesToReleaseList.

In one embodiment, the second signaling comprises a bfdResourcesToReleaseList.

In one embodiment, the at least one RS resource indicated by the second signaling to be added or modified or released in the first RS resource set is an SSB resource.

In one embodiment, the at least one RS resource indicated by the second signaling to be added or modified or released in the first RS resource set is a CSI-RS resource.

In one embodiment, the at least one RS resource indicated by the second signaling to be added or modified or released in the first RS resource set is used for RLM.

In one embodiment, the at least one RS resource indicated by the second signaling to be added or modified or released in the first RS resource set is used for BFD.

In one embodiment, the at least one RS resource indicated by the second signaling to be added or modified or released in the first RS resource set is used for RLM and BFD.

In one embodiment, the meaning of the phrase that the first RS resource set is reconfigured comprises: receiving a third signaling, the third signaling indicating that a QCL parameter of the first RS resource set is a first QCL parameter; herein, before the third signaling is received, a QCL parameter of the first RS resource set is a second QCL parameter.

In one embodiment, the third signaling is a DCI.

In one embodiment, the third signaling is a MAC CE.

In one embodiment, the first QCL parameter is different from the second QCL parameter.

In one embodiment, the first QCL parameter and the second QCL parameter respectively comprise reference signal resources associated with different PCIs.

In one embodiment, the first QCL parameter and the second QCL parameter respectively comprise reference signal resources associated with a same PCI.

In one embodiment, the first QCL parameter and the second QCL parameter respectively comprise reference signal resources associated with different cells.

In one embodiment, the first QCL parameter and the second QCL parameter respectively comprise reference signal resources associated with a same cell.

In one embodiment, the first QCL parameter and the second QCL parameter are for different cells.

In one embodiment, the first QCL parameter and the second QCL parameter are a same cell.

In one embodiment, the first QCL parameter comprises a spatial parameter.

In one embodiment, the first QCL parameter comprises a TCI-related parameter.

In one embodiment, the first QCL parameter comprises TCI-state.

In one embodiment, the first QCL parameter comprises at least partial fields or parameters in TCI-state.

In one embodiment, the first QCL parameter comprises a quasi-co-located (QCL) reference signal.

In one embodiment, the first QCL parameter comprises a QCL reference signal resource.

In one embodiment, the first QCL parameter comprises a QCL reference signal index.

In one embodiment, the first QCL parameter comprises a QCL reference signal resource of typeA.

In one embodiment, the first QCL parameter comprises a QCL reference signal resource of typeB.

In one embodiment, the first QCL parameter comprises a QCL reference signal resource of typeC.

In one embodiment, the first QCL parameter comprises a QCL reference signal resource of typeD.

In one embodiment, the first QCL parameter comprises a SSB-related parameter.

In one embodiment, the first QCL parameter comprises a CSI-RS-related parameter.

In one embodiment, the second QCL parameter is different from the second QCL parameter.

In one embodiment, the second QCL parameter and the second QCL parameter are respectively associated with different PCIs.

In one embodiment, the second QCL parameter comprises a spatial parameter.

In one embodiment, the second QCL parameter comprises a TCI-related parameter.

In one embodiment, the second QCL parameter comprises TCI-state.

In one embodiment, the second QCL parameter comprises at least partial fields or parameters in TCI-state.

In one embodiment, the second QCL parameter comprises a QCL reference signal.

In one embodiment, the second QCL parameter comprises a QCL reference signal resource.

In one embodiment, the second QCL parameter comprises a QCL reference signal index.

In one embodiment, the second QCL parameter comprises a QCL reference signal resource of typeA.

In one embodiment, the second QCL parameter comprises a QCL reference signal resource of typeB.

In one embodiment, the second QCL parameter comprises a QCL reference signal resource of typeC.

In one embodiment, the second QCL parameter comprises a QCL reference signal resource of typeD.

In one embodiment, the second QCL parameter comprises an SSB-related parameter.

In one embodiment, the second QCL parameter comprises a CSI-RS-related parameter.

In one embodiment, both the first QCL parameter and the second QCL parameter are for downlink.

In one embodiment, both the first QCL parameter and the second QCL parameter are for uplink.

In one embodiment, one of the first QCL parameter and the second QCL parameter is for uplink, and another one is for downlink.

In one embodiment, the first QCL parameter and the second QCL parameter are respectively for different beams.

In one embodiment, the first QCL parameter and the second QCL parameter are respectively for different TRPs.

In one embodiment, the third signaling is used to indicate that a beam determined by the second QCL parameter is stopped to be used or turned off.

In one embodiment, the third signaling is used to indicate that a TRP determined by the second QCL parameter is stopped to be used or turned off.

In one embodiment, the third signaling is used to indicate a first time window, and the first node performs a measurement on the first RS resource set based on a first QCL parameter within the first time window.

In one subembodiment of the above embodiment, the first node executes a measurement on the first RS resource set based on the second QCL parameter after the end of the first time window.

In one subembodiment of the above embodiment, the first node resets a first power control adjustment state to 0 before or at the beginning of the first time window.

In one subembodiment of the above embodiment, the first node resets a first power control adjustment state to 0 at or after the end of the first time window.

In one subembodiment of the above embodiment, a start or end of the first time window is used to trigger resetting a first power control adjustment state to 0.

In one embodiment, the behavior of executing a measurement on the first RS resource set based on a first QCL parameter comprises: a measurement performed on the first RS resource set uses at least one parameter in the first QCL parameter.

In one embodiment, the behavior of executing a measurement on the first RS resource set based on a first QCL parameter comprises: using the first QCL parameter to perform a measurement on an RS resource in the first RS resource set.

In one embodiment, the behavior of executing a measurement on the first RS resource set based on a first QCL parameter comprises: using the first QCL parameter to determine a time for measurement on the first RS resource set.

In one embodiment, the behavior of executing a measurement on the first RS resource set based on a first QCL parameter comprises: measuring on the first RS resource set by using the first QCL parameter as a receiving parameter.

In one embodiment, the behavior of executing a measurement on the first RS resource set based on a first QCL parameter comprises: using the first QCL parameter to determine frequency or bandwidth of a measurement performed on the first RS resource set.

In one embodiment, the behavior of executing a measurement on the first RS resource set based on a first QCL parameter comprises: measuring reference signal resources indicated by the first QCL parameter.

In one embodiment, the behavior of executing a measurement on the first RS resource set based on a first QCL parameter comprises: determining transmission power of the first RS resource set by using the first QCL parameter.

In one embodiment, the behavior of executing a measurement on the first RS resource set based on a first QCL parameter comprises: using the first QCL parameter to calculate a measurement result of a measurement performed on the first RS resource set.

In one embodiment, the behavior of executing a measurement on the first RS resource set based on a first QCL parameter comprises: a reference signal determined by the first QCL parameter occupies the first RS resource set.

In one embodiment, the behavior of executing a measurement on the first RS resource set based on a second QCL parameter comprises: a measurement on the first RS resource set uses at least one parameter in the second QCL parameter.

In one embodiment, the behavior of executing a measurement on the first RS resource set based on a second QCL parameter comprises: performing a measurement by using one RS resource in the first RS resource set determined by the second QCL parameter.

In one embodiment, the behavior of executing a measurement on the first RS resource set based on a second QCL parameter comprises: using the second QCL parameter to determine a time for measurement on the first RS resource set.

In one embodiment, the behavior of executing a measurement on the first RS resource set based on a second QCL parameter comprises: measuring on the first RS resource set by using the second QCL parameter as a receiving parameter.

In one embodiment, the behavior of executing a measurement on the first RS resource set based on a second QCL parameter comprises: using the second QCL parameter to determine frequency or bandwidth of measurement on the first RS resource set.

In one embodiment, the behavior of executing a measurement on the first RS resource set based on a second QCL parameter comprises: measuring reference signal resources indicated by the second QCL parameter.

In one embodiment, the behavior of executing a measurement on the first RS resource set based on a second QCL parameter comprises: determining transmission power of the first RS resource set by using the second QCL parameter.

In one embodiment, the behavior of executing a measurement on the first RS resource set based on a second QCL parameter comprises: using the second QCL parameter to calculate a measurement result of a measurement performed on the first RS resource set.

In one embodiment, the behavior of executing a measurement on the first RS resource set based on a first QCL parameter comprises: a reference signal determined by the second QCL parameter occupies the first RS resource set.

In one embodiment, the meaning of the phrase that the first RS resource set is reconfigured comprises: receiving a fourth signaling, the fourth signaling being used to indicate executing a first configuration set, the first configuration set comprising cell handover; the fourth signaling being a physical-layer signaling or the fourth signaling being a MAC-layer signaling.

In one embodiment, the meaning of the phrase that the first RS resource set is reconfigured comprises: receiving a fourth signaling.

In one embodiment, the first configuration set comprises a MAC configuration.

In one embodiment, the first configuration set comprises an RRC configuration.

In one embodiment, the first configuration set comprises spCellConfig.

In one embodiment, the first configuration set comprises a configuration of a destination cell.

In one embodiment, the first configuration set comprises reconfigurationWithSync.

In one embodiment, the first configuration set comprises an RRCReconfiguration.

In one embodiment, the first configuration set comprises a configuration of at least one timer.

In one embodiment, the fourth signaling is a DCI.

In one embodiment, the fourth signaling is a MAC CE.

In one embodiment, the fourth signaling is used to trigger cell handover.

In one embodiment, the fourth signaling is used to indicate cell handover.

In one embodiment, the fourth signaling is used to indicate an SpCell.

In one embodiment, the fourth signaling is used to indicate a PCI of an SpCell.

In one embodiment, the fourth signaling is used to indicate an additionalPCI of the first node.

In one embodiment, the fourth signaling is used to indicate a PCI other than an additionalPCI of the first node.

In one embodiment, the fourth signaling is used to indicate an execution of PCI handover.

In one embodiment, the fourth signaling is used to indicate that a physCellId of ServingCellConfigCommon is set to a value of additionalPCI.

In one embodiment, the fourth signaling is used to indicate that a value of an additionalPCI is set to a value of physCellId of ServingCellConfigCommon.

In one embodiment, after the fourth signaling is executed, the first RS resource set comprises RS resources of a destination cell.

In one embodiment, before the fourth signaling is executed, the first RS resource set comprises RS resources of a source cell.

In one embodiment, after the fourth signaling is executed, the first RS resource set does not comprise RS resources of a source cell.

In one embodiment, before the fourth signaling is executed, the first RS resource set does not comprise RS resources of a destination cell.

In one embodiment, the meaning of the phrase that the first RS resource set is reconfigured comprises: a fifth signaling is received.

In one embodiment, the fifth signaling is used to respond to a first signal.

In one embodiment, the first signal is a physical-layer signal.

In one embodiment, the first signal is a MAC CE.

In one embodiment, the first signal is an RRC message.

In one embodiment, the first signal is a random access signal.

In one embodiment, the first signal is used to indicate a completion of handover.

In one embodiment, the first signal is used for beam recovery.

In one embodiment, the first signal is used to indicate a completion of reconstruction.

In one embodiment, the first signal is used for link recovery.

In one embodiment, the first signal is used for beam failure recovery.

In one embodiment, the first signal belongs to a random access procedure.

In one embodiment, the fifth signaling belongs to a random access procedure.

In one embodiment, the fifth signaling does not belong to a message in a random access procedure.

In one embodiment, the fifth signaling comprises a DCI.

In one embodiment, the fifth signaling comprises a MAC CE.

In one embodiment, the fifth signaling comprises an RRC message.

In one embodiment, the fifth signaling is used to confirm beam recovery.

In one embodiment, the fifth signaling is used to confirm link recovery.

In one embodiment, the fifth signaling is used to confirm a connection establishment or connection recovery.

In one embodiment, beam failure recovery triggers a transmission of the first signal.

In one embodiment, as a response to beam failure, the first node U01 transmits the first signal.

In one embodiment, the first event set comprises at least one measurement event.

In one embodiment, the first event set comprises: at least one of event A1, event A2, event A3, event A4, event A5, and event A6.

In one embodiment, the first event set comprises: at least one of event B1 and event B2.

In one embodiment, the first event set comprises: event I1.

In one embodiment, the first event set comprises: event D1.

In one embodiment, the first event set comprises: event D2.

In one embodiment, the first event set comprises: event T1.

In one embodiment, the first event set comprises: event T2.

In one embodiment, the first event set comprises: event X1.

Embodiment 6

Figure 6:
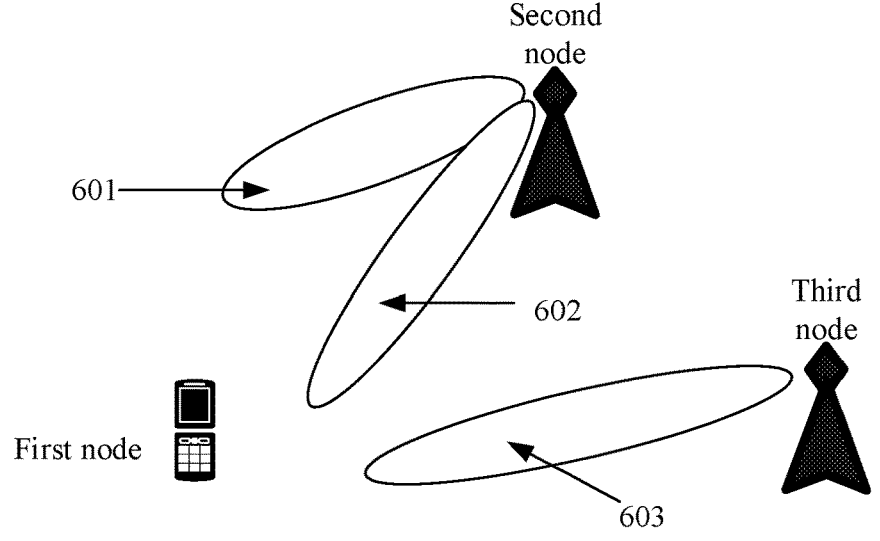
FIG. 6 illustrates a schematic diagram of a reference signal according to one embodiment of the present application.

Embodiment 6 illustrates a schematic diagram of a reference signal according to one embodiment of the present application, as shown in FIG. 6.

601, 602 and 603 in FIG. 6 are all represented by ellipses, representing transmissions determined by different transmission parameters.

In one embodiment, the second node is a serving cell.

In one embodiment, the third node is a serving cell.

In one embodiment, the second node and the third node belong to a serving cell and are associated with different PCIs.

In one embodiment, 601, 602, and 603 are different beams.

In one embodiment, 601 is a first beam; 602 is a second beam; 603 is a third beam.

In one embodiment, 601, 602, and 603 are different TRPs.

In one embodiment, 601 is a first TRP, 602 is a second TRP, and 603 is a third TRP.

In one embodiment, 601 corresponds to a first parameter group; 602 corresponds to a second parameter group; 603 corresponds to a third parameter group.

In one subembodiment of the embodiment, the first parameter group is a set of spatial parameters; the second parameter group is a set of spatial parameters; and the third parameter group is a set of spatial parameters.

In one embodiment, 601 corresponds to a first reference signal resource; 602 is a second reference signal resource; 603 is a third reference signal resource.

In one embodiment, 601, 602, and 603 are determined by different reference signals.

In one embodiment, 601 is associated with a first RS resource set before being reconfigured.

In one embodiment, 602 is associated with a first RS resource set after being reconfigured.

In one embodiment, 603 is associated with a first RS resource set after being reconfigured.

In one embodiment, 601 is an SSB or is associated with an SSB.

In one embodiment, 601 is a CSI-RS or is associated with a CSI-RS.

In one embodiment, the first QCL parameter is related to 601 in 601 and 602.

In one embodiment, the second QCL parameter is related to 602 in 601 and 602.

In one embodiment, 601 is a set of parameters or configurations or identities of a first RS resource set.

In one embodiment, 602 is a set of parameters or configurations or identities of a second RS resource group.

In one embodiment, the first signaling indicates that activated RS resources in a first RS resource set correspond to 602.

In one embodiment, the first signaling indicates that deactivated RS resources in a first RS resource set correspond to 601.

In one embodiment, the first signaling indicates that activated RS resources in a first RS resource set correspond to 603.

In one embodiment, added RS resources in a first RS resource set indicated by the second signaling correspond to 602.

In one embodiment, released RS resources in a first RS resource set indicated by the second signaling correspond to 601.

In one embodiment, added RS resources in a first RS resource set indicated by the second signaling correspond to 603.

In one embodiment, modified RS resources in a first RS resource set indicated by the second signaling are to modify RS resources corresponding to 601 to RS resources corresponding to 602.

In one embodiment, a first QCL parameter indicated by the third signaling corresponds to 602.

In one embodiment, a first QCL parameter indicated by the third signaling corresponds to 603.

In one embodiment, a second QCL parameter indicated by the third signaling corresponds to 601.

In one embodiment, the first configuration parameter set indicated by the fourth signaling corresponds to 603.

In one embodiment, 603 corresponds to a destination cell of the first node.

In one embodiment, 601 corresponds to a source cell of the first node.

In one embodiment, a motion state of the first node relative to 601 is different from a motion state relative to 602.

In one embodiment, a motion state of the first node relative to 601 is different from a motion state relative to 603.

In one embodiment, a motion state of the first node relative to 602 is different from a motion state relative to 603.

In one embodiment, a motion state comprises one of low motion state, stationary state, and high motion state.

In one embodiment, the first RS resource set only comprises one RS resource.

In one embodiment, the second RS resource set corresponds to one of 601, 602, 603.

Embodiment 7

Figure 7:
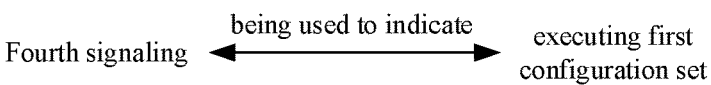
FIG. 7 illustrates a schematic diagram of a fourth signaling being used to execute a first configuration set according to one embodiment of the present application.

Embodiment 7 illustrates a schematic diagram of a fourth signaling being used to execute a first configuration set according to one embodiment of the present application, as shown in FIG. 7.

In one embodiment, the first configuration set comprises at least one configuration parameter.

In one embodiment, executing the first configuration set refers to executing all configurations in the first configuration set.

In one embodiment, executing the first configuration set refers to applying all configurations in the first configuration set.

In one embodiment, the fourth signaling indicates a parameter associated with the first configuration set to indicate executing the first configuration set.

In one subembodiment of the embodiment, the parameter is an index of the first configuration set.

In one subembodiment of the embodiment, the parameter is an identity of the first configuration set.

In one subembodiment of the embodiment, the parameter is an identity of a cell associated with the first configuration set.

In one embodiment, the fourth signaling implicitly indicates the first configuration set.

In one embodiment, the meaning of the phrase that a fourth signaling is used to indicate executing a first configuration set comprises: upon receiving the fourth signaling, executing the first configuration set.

In one subembodiment of the embodiment, the fourth signaling is only associated with the first configuration set, and the fourth signaling does not need to explicitly indicate the first configuration set.

In one embodiment, the first configuration set is associated with the first execution condition, and the fourth signaling indicates the first execution condition.

In one subembodiment of the embodiment, the fourth signaling indicates an identity or index of the first execution condition.

In one embodiment, the fourth signaling is a MAC CE.

In one embodiment, a field comprised in a MAC subheader of the fourth signaling indicates the first configuration set.

In one embodiment, a field comprised in a MAC subheader of the fourth signaling indicates executing the first configuration set.

In one embodiment, an RNTI for scrambling the fourth signaling is used to indicate the first configuration set or to indicate executing the first configuration set.

Embodiment 8

Figure 8:
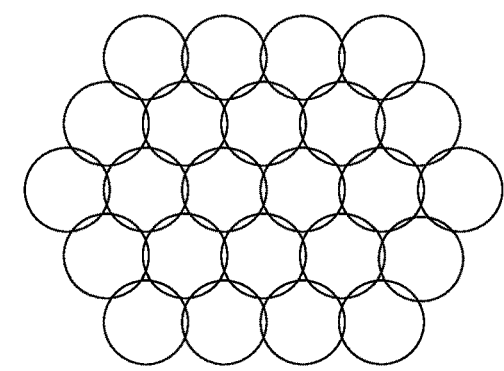
FIG. 8 illustrates a schematic diagram of a beam according to one embodiment of the present application.

Embodiment 8 illustrates a schematic diagram of a beam according to one embodiment of the present application, as shown in FIG. 8.

FIG. 8 illustrates a coverage of beams in NTN communications; in NTN communications, especially for synchronous orbit satellites, due to the distance from the earth and above the earth, the beam shapes are often represented by circles. If the satellite is covered at a certain angle, the beam projection on the ground can also be close to an ellipse. Of course, the beam or the footprint of the beam is determined by a series of spatial parameters, and there is no absolute physical shape, the description of the above shapes is just to facilitate understanding. In NTN communications, different geographical zones are generally covered by different beams, while in TN communications, a UE can sometimes receive multiple beams that meet the requirements simultaneously; in NTN communications, a cell can comprise multiple beams; in addition, the signal propagation characteristics in NTN are different from those in TN networks. In NTN, the signal strength within a beam slowly decreases from the center to the edge and then drops sharply. If this is not taken into account, it may lead to communication interruption at the edge due to sudden signal deterioration, resulting in a delay in response.

In one embodiment, the network indicates the ephemeris of a satellite.

In one embodiment, the ephemeris of the satellite indicated by the network determines, or the network explicitly indicates a first reference position.

In one embodiment, a first reference position is a center point of a beam.

In one embodiment, a first reference position is a center point of a cell.

In one embodiment, the second measurement criterion is: when a distance between the first node and the first reference position is less than a first position threshold, the second measurement criterion is satisfied; when a distance between the first node and the first reference position is greater than a first position threshold, the second measurement criterion is not satisfied.

In one embodiment, the network indicates the first position threshold.

In one embodiment, the first node determines the first position threshold through the ephemeris.

In one embodiment, the first node determines the first position threshold through an internal algorithm.

In one embodiment, the advantage of the above method is that when the first node is at the edge of a beam, even if the distance change of the signal has not been detected through measurement, measures can be taken in advance to pay closer attention to the changes in the channel to reduce communication interruption.

In one embodiment, the first reference time is a moment.

In one embodiment, the first reference time is based on UTC.

In one embodiment, the third measurement criterion is: when a difference value between time and the first reference time has not yet reached a first time threshold, the second measurement criterion is satisfied; when a difference value between time and the first reference time exceeds a first time threshold, the second measurement criterion is not satisfied.

In one embodiment, the network of the first node indicates the first time threshold.

In one embodiment, the first node determines the first threshold based on the ephemeris.

In one embodiment, the first node determines the first threshold based on the position.

In one embodiment, the first reference time is network-indicated.

In one embodiment, the first reference time is determined by the first node itself.

In one embodiment, the first reference time is a time at which the first node starts entering into a current beam or is served by a current beam.

In one embodiment, the first reference time is an absolute time determined by the satellite orbit.

In one embodiment, the first reference time is a time at which a signaling used for configuring the first reference time is received.

In one embodiment, the first reference time is a time at which a signaling used for configuring the first reference time is transmitted.

In one embodiment, the first reference time is based on system time.

In one embodiment, the advantage of the above methods is that controlling a measurement of UE through time is beneficial for preparing in advance and responding to potential drastic changes in the signal before it has significantly changed.

Embodiment 9

Figure 9:
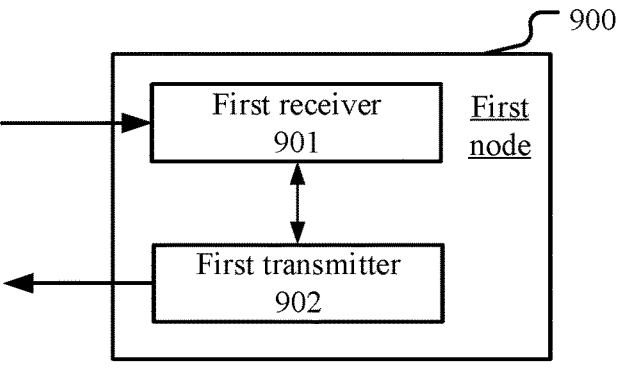
FIG. 9 illustrates a schematic diagram of a processor in a first node according to one embodiment of the present application.

Embodiment 9 illustrates a structure block diagram of a processor in a first node according to one embodiment of the present application, as shown in FIG. 9. In FIG. 9, a processor 900 of a first node comprises a first receiver 901 and a first transmitter 902. In Embodiment 9, the first receiver 901, as a response to a first event, measures first reference RSRP; executes a link quality evaluation based on a first measurement criterion;

herein, when a difference value between the first reference RSRP and current RSRP is less than a first threshold, the first measurement criterion is satisfied; when a difference value between the first reference RSRP and the current RSRP is not less than a first threshold, the first measurement criterion is not satisfied; the meaning of the phrase of executing a link quality evaluation based on a first measurement criterion comprises: when the first measurement criterion is satisfied, an evaluation on first radio link quality is completed within a first evaluation period; when the first measurement criterion is not satisfied, an evaluation on first radio link quality is completed within a second evaluation period; the first event is any event in a first event set, and the first event set comprises that the first RS resource set is re-configured.

In one embodiment, the meaning of the phrase of measuring first reference RSRP comprises: setting a value of the first reference RSRP to a value of current RSRP.

In one embodiment, the first event set comprises: receiving a configuration of a first measurement criterion, a MAC of a cell group configured with a first measurement criterion successfully completing a random access procedure, a difference value between the current RSRP and the first reference RSRP being greater than 0, the first measurement criterion not being satisfied within a first time period.

In one embodiment, the meaning of the phrase that the first RS resource set is reconfigured comprises: receiving a first signaling, the first signaling being used to indicate activating or de-activating at least one RS resource in the first RS resource set; the first signaling being a physical-layer signaling or the first signaling being a MAC-layer signaling.

In one embodiment, the meaning of the phrase that the first RS resource set is reconfigured comprises: receiving a second signaling, the second signaling being used to indicate adding or modifying or releasing at least one RS resource in the first RS resource set, and the second signaling being an RRC signaling.

In one embodiment, the meaning of the phrase that the first RS resource set is reconfigured comprises: receiving a third signaling, the third signaling indicating that a QCL parameter of the first RS resource set is a first QCL parameter;

herein, before the third signaling is received, a QCL parameter of the first RS resource set is a second QCL parameter.

In one embodiment, the first event set comprises an expiration of a first timer.

In one embodiment, the meaning of the phrase that the first RS resource set is reconfigured comprises: receiving a fourth signaling, the fourth signaling being used to indicate executing a first configuration set, the first configuration set comprising cell handover; the fourth signaling being a physical-layer signaling or the fourth signaling being a MAC-layer signaling.

In one embodiment, the meaning of the phrase that the first RS resource set is reconfigured comprises: receiving a fifth signaling, the fifth signaling being used to respond to the first signal;

herein, a reason why the first signal is triggered is due to beam failure; a transmitter of the first signal is the first node.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 901 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 902 comprises at least one of the antenna 452, the transmitter 454, the transmitting processor 468, the multi-antenna transmitting processor 457, the controller/processor 459, the memory 460 or the data source 467 in Embodiment 4.

Embodiment 10

Figures 10, 11:
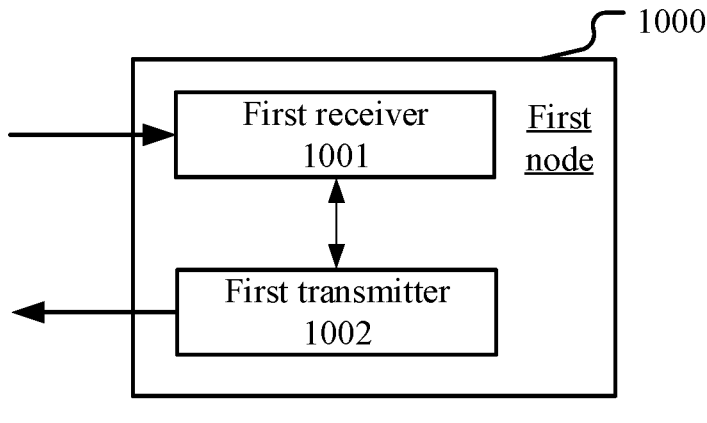
FIG. 10 illustrates a schematic diagram of a processor in a first node according to one embodiment of the present application.
FIG. 11 illustrates a schematic diagram of a processor in a first node according to one embodiment of the present application.

Embodiment 10 illustrates a structure block diagram of a processor in a first node according to one embodiment of the present application, as shown in FIG. 10. In FIG. 10, a processor 1000 in a first node comprises a first receiver 1001 and a first transmitter 1002. In Embodiment 10, the first receiver 1001 executes a link quality evaluation based on at least a latter of current RSRP and a second measurement criterion;

herein, the second measurement criterion is: when any event in a second event set is satisfied, the second measurement criterion is satisfied or triggered; when all events in a second event set are not triggered, the second measurement criterion is not satisfied; the second event set comprises: a distance between a position of the first node and the first reference position is less than or not greater than a first position threshold.

In one embodiment, the first receiver 1001 receives a sixth signaling, and the sixth signaling indicates the first reference position.

In one embodiment, the first reference position is a center point of a current beam.

In one embodiment, the first receiver 1001 receives a sixth signal, the sixth signaling indicates an ephemeris, and the ephemeris is used to determine the first reference position.

In one embodiment, current RSRP is used to determine whether an evaluation on first radio link quality is completed within a first evaluation period or within a second evaluation period.

In one embodiment, the meaning of the phrase of executing a link quality evaluation based on at least a latter of current RSRP and a second measurement criterion comprises: when the second measurement criterion is satisfied, an evaluation on first radio link quality is completed within a first evaluation period; when the second measurement criterion is not satisfied, an evaluation on first radio link quality is completed within a second evaluation period.

In one embodiment, the meaning of the phrase of executing a link quality evaluation based on at least a latter of current RSRP and a second measurement criterion comprises: when the second measurement criterion is satisfied and current RSRP is greater than a first RSRP threshold, an evaluation on first radio link quality is completed within a first evaluation period; when the second measurement criterion is not satisfied or when RSRP is less than a first RSRP threshold, an evaluation on first radio link quality is completed within a second evaluation period.

In one embodiment, a serving cell of the first node indicates the first RSRP threshold.

In one embodiment, when a distance between a position of the first node and the first reference position is equal to a first position threshold, the second measurement criterion is satisfied.

In one embodiment, when a distance between a position of the first node and the first reference position is equal to a first position threshold, the second measurement criterion is not satisfied.

In one embodiment, when a distance between a position of the first node and the first reference position is less than a first position threshold, the second measurement criterion is satisfied; when a distance between a position of the first node and the first reference position is greater than a first position threshold, the second measurement criterion is not satisfied.

In one embodiment, the fourth event set comprises at least one event in a first event set.

In one embodiment, the first node has positioning capability.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

Embodiment 11

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102. In Embodiment 11, the first receiver 1101 executes a link quality evaluation based on at least a latter of current RSRP and a third measurement criterion;

herein, the third measurement criterion is: when any event in a second event set is satisfied or triggered, the second measurement criterion is satisfied; when all events in a second event set are not triggered, the second measurement criterion is not satisfied; the second event set comprises at least one of a second event and a third event; the second event is an expiration of a first timer; the third event is that a difference value between a current time and a first reference time has not yet reached or exceeded a first time threshold.

In one embodiment, the first receiver 1101 receives a seventh signaling, and the seventh signaling indicates the first reference time.

In one embodiment, the first reference position is a center point of a current beam.

In one embodiment, the first receiver 1101 receives a seventh signal, the seventh signaling indicates an ephemeris, and the ephemeris is used to determine the first reference time.

In one embodiment, current RSRP is used to determine whether an evaluation on first radio link quality is completed within a first evaluation period or within a second evaluation period.

In one embodiment, the meaning of the phrase of executing a link quality evaluation based on at least a latter of current RSRP and a third measurement criterion comprises: when the third measurement criterion is satisfied, an evaluation on first radio link quality is completed within a first evaluation period; when the third measurement criterion is not satisfied, an evaluation on first radio link quality is completed within a second evaluation period.

In one embodiment, the meaning of the phrase of executing a link quality evaluation based on at least a latter of current RSRP and a third measurement criterion comprises: when the third measurement criterion is satisfied and current RSRP is greater than a first RSRP threshold, an evaluation on first radio link quality is completed within a first evaluation period; when the third measurement criterion is not satisfied or current RSRP is less than a first RSRP threshold, an evaluation on first radio link quality is completed within a second evaluation period.

In one embodiment, the second event set comprises at least one event in a first event set.

In one embodiment, a serving cell of the first node indicates the first RSRP threshold.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:
   a transceiver; and
   a processor, wherein the transceiver and the processor are configured to:

detect occurrence of at least one event from a set of events, wherein the set of event comprises reconfiguring a Reference Signal (RS) resource set, in response to detecting the at least one event, perform measurement on the RS resource set to determine a reference RS Receiving Power (RSRP), determine that a measurement criterion is satisfied upon determining that a difference value between the reference RSRP and a current RSRP is less than a first threshold value, determine that the measurement criterion is not satisfied when the difference value between the first reference RSRP and the current RSRP is not less than the first threshold value, on a condition that the measurement criterion is satisfied, evaluate a first radio link quality within a first evaluation period, and on a condition that the first measurement criterion is not satisfied, evaluate the radio link quality within a second evaluation period.

2. The UE according to claim 1, wherein measuring the reference RSRP includes setting a value of the reference RSRP to a value of the current RSRP.

3. The UE according to claim 2, wherein the set of events comprises:

receiving a configuration of the first measurement criterion, a MAC of a cell group configured with the measurement criterion successfully completing a random access procedure, a difference value between the current RSRP and the reference RSRP being greater than 0, or the measurement criterion not being satisfied within first time period.

4. The UE according to claim 3, wherein reconfiguring the RS resource set includes receiving a first signaling indicative of activating or de-activating at least one RS resource in the RS resource set, and wherein the first signaling is a physical-layer signaling or a MAC-layer signaling.

5. The UE according to claim 3, wherein reconfiguring the RS resource set includes receiving a second signaling indicative of adding or modifying or releasing at least one RS resource in the RS resource set, and wherein the second signaling is an RRC signaling.

6. The UE according to claim 3, wherein reconfiguring the RS resource set includes receiving a third signaling indicating that a QCL parameter of the RS resource set is a QCL parameter, and wherein before the third signaling is received, a QCL parameter of the RS resource set is a second QCL parameter.

7. The UE according to claim 3, wherein reconfiguring the RS resource set includes receiving a fourth signaling indicative of executing a cell handover, and wherein the fourth signaling is a physical-layer signaling or a MAC-layer signaling.

8. The UE according to claim 3, wherein reconfiguring the RS resource set includes receiving a fifth signaling used to respond to a first signal, and wherein the UE transmits the first signal upon detecting a beam failure.

9. The UE according to claim 1, wherein the set of events comprises:

receiving a configuration of the measurement criterion, a Media Access Control (MAC) of a cell group configured with the measurement criterion successfully completing a random access procedure, a difference value between the current RSRP and the reference RSRP being greater than 0, or the measurement criterion not being satisfied within the first time period.

10. The UE according to claim 1, wherein reconfiguring the RS resource set includes receiving a first signaling indicative of activating or de-activating at least one RS resource in the first RS resource set, and wherein the first signaling is a physical-layer signaling or a MAC-layer signaling.

11. The UE according to claim 1, wherein reconfiguring the RS resource set includes receiving a second signaling indicative of adding or modifying or releasing at least one RS resource in the RS resource set, and wherein the second signaling is a Radio Resource Control (RRC) signaling.

12. The UE according to claim 1, wherein reconfiguring the RS resource set includes receiving a third signaling indicating that a Quasi Co-Location (QCL) parameter of the RS resource set is a first QCL parameter, and wherein before the third signaling is received, a QCL parameter of the RS resource set is a second QCL parameter.

13. The UE according to claim 12, wherein the third signaling indicates a first time window, and wherein the UE executes a measurement on the RS resource set based on the first QCL parameter within the first time window, and wherein after the end of the first time window, the UE executes a measurement on the RS resource set based on the second QCL parameter.

14. The UE according to claim 13, wherein the transceiver and the processor are further configured to:

reset a power control adjustment state to 0 before or at the beginning of the first time window.

15. The UE according to claim 1, wherein the set of events includes an expiration of a timer.

16. The UE according to claim 1, wherein reconfiguring the RS resource set includes receiving a fourth signaling, indicative of executing a cell handover, and wherein the fourth signaling is a physical-layer signaling or a MAC-layer signaling.

17. The UE according to claim 1, wherein reconfiguring the RS resource set includes receiving a fifth signaling used to respond to a first signal, and wherein the UE transmits the first signal upon detecting a beam failure.

18. The UE according to claim 1, wherein the set of events includes receiving a signal after executing reconfiguration WithSync comprised in spCellConfig, reconfiguration With-Sync comprised in spCellConfig not triggering a random access.

19. The UE according to claim 1, wherein the RS resource set only comprises one of a Channel State Information Reference Signal (CSI-RS) and a Synchronization Signal Block (SSB).

20. A method in a user equipment (UE) for wireless communications, the method comprising:

detecting occurrence of at least one event from a set of events, wherein the set of event comprises reconfiguring a Reference Signal (RS) resource set;

in response to detecting the at least one event, perform measurement on the RS resource set for determining a reference RSRP;

determining that a measurement criterion is satisfied upon determining that a difference value between the reference RSRP and a current RSRP is less than a threshold value;

determining that the measurement criterion is not satisfied when the difference value between the reference RSRP and the current RSRP is not less than the threshold value;

on a condition that the measurement criterion is satisfied, evaluating a radio link quality within a first evaluation period, and on a condition that the measurement criterion is not satisfied, evaluating the radio link quality is completed within a second evaluation period.

\* \* \* \* \*